United States Patent
Chen

(10) Patent No.: US 12,292,928 B2
(45) Date of Patent: May 6, 2025

(54) GRAPH QUERY MANAGEMENT USING BLOOM FILTERS AND EDGE DELTA INDEXES

(71) Applicant: TigerGraph, Inc., Redwood City, CA (US)

(72) Inventor: Songting Chen, Portola Valley, CA (US)

(73) Assignee: TigerGraph, Inc., Redwood City, CA (US)

( * ) Notice: Subject to any disclaimer, the term of this patent is extended or adjusted under 35 U.S.C. 154(b) by 0 days.

(21) Appl. No.: 17/574,373

(22) Filed: Jan. 12, 2022

(65) Prior Publication Data

US 2022/0222298 A1 Jul. 14, 2022

Related U.S. Application Data

(60) Provisional application No. 63/136,963, filed on Jan. 13, 2021.

(51) Int. Cl.
*G06F 16/901* (2019.01)
*G06F 16/23* (2019.01)

(52) U.S. Cl.
CPC ...... *G06F 16/9024* (2019.01); *G06F 16/2379* (2019.01)

(58) Field of Classification Search
CPC .......................... G06F 16/9024; G06F 16/2379
USPC ....................................................... 707/741
See application file for complete search history.

(56) References Cited

U.S. PATENT DOCUMENTS

| | | | | |
|---|---|---|---|---|
| 8,682,932 | B2 * | 3/2014 | Raghavan | G06F 16/9024 707/798 |
| 8,972,337 | B1 * | 3/2015 | Gupta | G06F 16/221 707/602 |
| 9,104,665 | B1 * | 8/2015 | Bik | H04L 5/0032 |
| 2012/0110024 | A1 * | 5/2012 | Wei | G06F 16/282 707/E17.055 |
| 2014/0019490 | A1 * | 1/2014 | Roy | G06F 16/20 707/798 |
| 2014/0172914 | A1 * | 6/2014 | Elnikety | G06F 16/9024 707/774 |
| 2016/0071233 | A1 * | 3/2016 | Macko | G06T 11/206 345/440 |
| 2018/0239796 | A1 * | 8/2018 | Song | G06F 16/282 |
| 2019/0310970 | A1 * | 10/2019 | Braghin | G06F 16/2228 |
| 2019/0325075 | A1 * | 10/2019 | Hilloulin | G06F 16/9024 |
| 2019/0384861 | A1 * | 12/2019 | Ghoting | G06Q 10/105 |
| 2021/0157850 | A1 * | 5/2021 | Tong | G06F 16/245 |
| 2021/0173581 | A1 * | 6/2021 | Uno | G06F 3/067 |
| 2021/0182285 | A1 * | 6/2021 | Haprian | G06F 16/24561 |
| 2021/0286790 | A1 * | 9/2021 | Lozi | G06F 16/212 |
| 2022/0129451 | A1 * | 4/2022 | Haprian | G06F 16/252 |

* cited by examiner

*Primary Examiner* — Amy Ng
*Assistant Examiner* — Antonio J Caiado

(57) ABSTRACT

Systems, methods, and software described herein manage graph query response using bloom filters and edge indexes. In one implementation, a graph management system may generate indexes and delta indexes for edges in a graph. Once generated, the graph management system may receive a query to the graph and respond to the query using the index and at least one delta index of the delta indexes.

13 Claims, 13 Drawing Sheets

GRAPH 100

EDGE INDEX 750
(TYPE 720)

| VALUE 730 | EDGE 702 | EDGE 706 |
|---|---|---|
| VALUE 731 | EDGE 703 | EDGE 705 |
| VALUE 732 | EDGE 704 | |

DELTA INDEX 755
(TYPE 720)

| VALUE 731 | EDGE 705/ REMOVE/ TIME STAMP 760 |
|---|---|
| VALUE 732 | EDGE 707/ ADD/ TIME STAMP 761 |

FIGURE 7B

MERGED EDGE INDEX 752
(TYPE 720)

| VALUE 730 | EDGE 702 | EDGE 706 |
|---|---|---|
| VALUE 731 | EDGE 703 | |
| VALUE 732 | EDGE 704 | EDGE 707 |

FIGURE 7C

GRAPH QUERY MANAGEMENT USING BLOOM FILTERS AND EDGE DELTA INDEXES

RELATED APPLICATIONS

This application is related to and claims priority to U.S. Provisional Patent Application No. 63/136,963, entitled "GRAPH QUERY MANAGEMENT USING BLOOM FILTERS AND EDGE DELTA INDEXES," filed on Jan. 13, 2021, and which is hereby incorporated by reference in its entirety.

BACKGROUND

Relational databases generally store data in one or more tables with rows and columns for the various data items. In contrast, graph databases represent data in the form of vertices and edges, where a vertex represents an entity or data instance, and an edge represents a relationship of some type between any two vertices. Graph database representations allow data modeling that more closely parallels the real world and provides a visual representation of connected data. In general, a graph is a set of objects, called vertices, nodes, or points, which are connected by links, called lines or edges. The edges establish relationships (connections) between the vertices. Graphs can be directed or undirected. In an undirected graph, an edge from first point to a second point is considered to be the same as a line from the second point to the first point. In a directed graph, the two directions are treated as distinct directed edges.

Although graph databases provide an efficient manner for storing data, difficulties can arise in efficiently responding to queries of the graph. In particular, as graphs expand with a greater quantity of vertices and edges, queries to the graphs may consume additional processing and time resources to search the graph and respond to the queries. These difficulties are often compounded when each of the vertices includes multiple searchable attributes, such as names, ages, birthdays, or other similar attributes, requiring a system to traverse the vertices of the graph to identify vertices (or edges) with a relevant attribute.

Overview

Provided herein are systems and methods to use bloom filters and edge delta indexes to respond to graph queries. In one implementation, a graph management system generates an index corresponding to an attribute type associated with edges in a graph, wherein the each of the edges includes an identifier and one or more attributes of one or more attribute types. The graph management system further generates one or more delta indexes associated with the index based on one or more modifications to the graph, obtains a query to the graph associated with the attribute type, and generates a query to the graph associated with the attribute type.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIGS. 7A-7C illustrate an operational scenario of updating an edge index according to an implementation.

DETAILED DESCRIPTION

Figure 1:
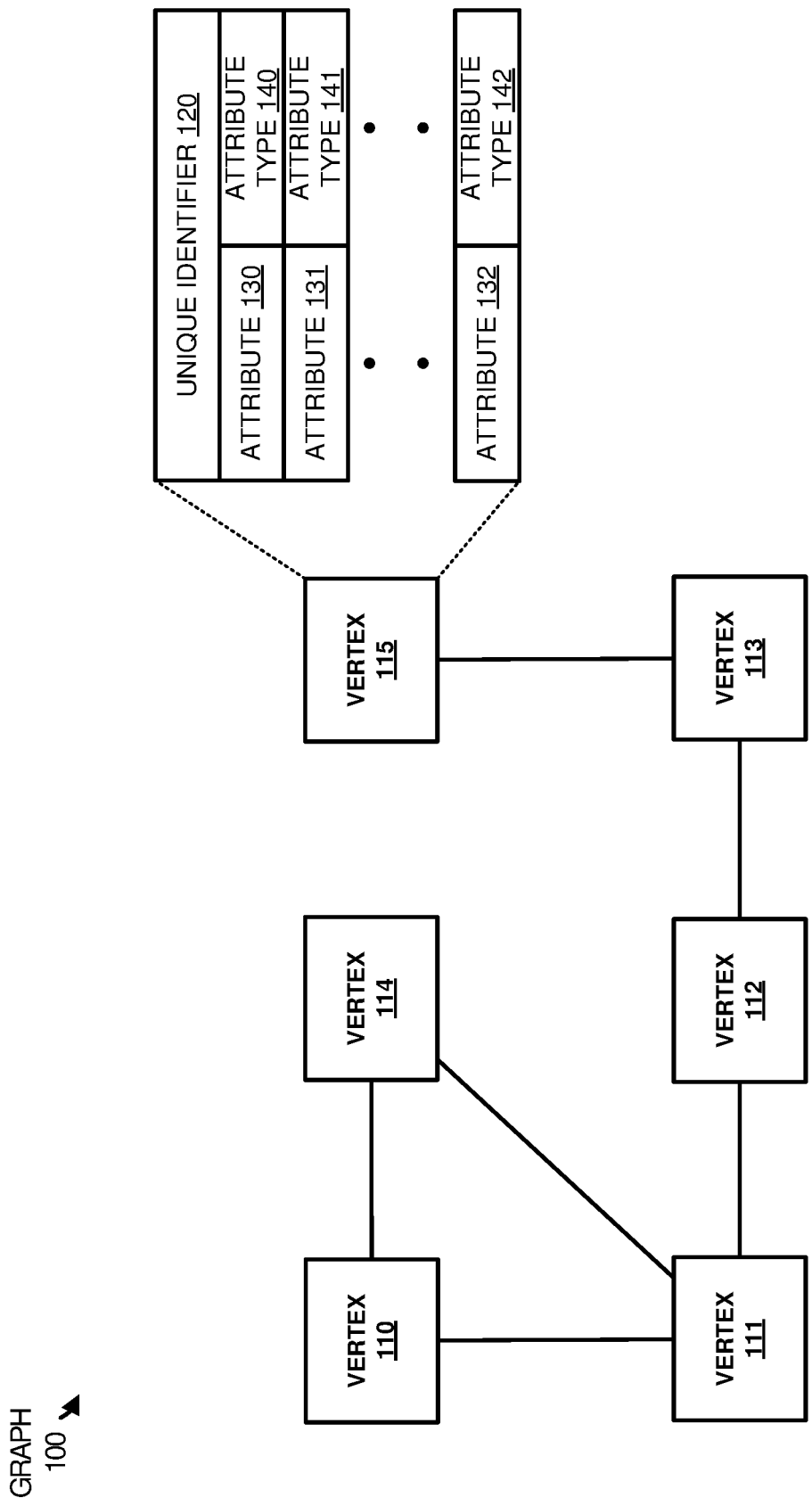
FIG. 1 illustrates a graph according to an implementation.

Examples herein provide operations to manage graph query processing using bloom filters associated with different portions of a graph. In one implementation, a graph management system may maintain a graph that includes a plurality of vertices and a plurality of edges that are used to define relationships between the plurality of vertices. Each of the vertices may include a unique identifier and may include various attributes (also referred to as attribute values). For example, a vertex in a social networking graph may include a unique identifier for a user of the social network, while the attributes may include various information about the user, such as a name, location, birthday, or other information about the user.

In some implementations, to assist in managing queries to the graph, an index may be generated that corresponds to an attribute type for the vertices. In particular, while each of the vertices may include a unique identifier to individually identify (and index) each of the vertices in the graph, it may be inefficient to traverse each of the individual vertices to identify attributes of interest. Instead, an index may be generated to identify vertices that correspond to an attribute type of interest. As an example, a social network may allocate each of the individual users a unique identifier but may generate an index that is capable of matching users to their current location. Thus, rather than traversing each of the vertices to identify locations associated with the users, the graph management system may consult the index to identify one or more locations of interest and the vertices (users) that correspond to the location.

In some examples, a graph may be distributed into different segments or portions. These portions may be located on the same computing system or may be distributed across multiple computing systems as a graph storage system. In addition to distributing the graph into portions, the index may also be distributed to correspond to each of the portions. In particular, a first index may be used to index the vertices that are located in a first portion of the graph, while a second index may be used to index the vertices that are located in a second portion of the graph. To quickly identify portions of the graph that are relevant to a query, the graph management system may generate a bloom filter for each of the portions that correspond to the index for that portion. A bloom filter is a space-efficient probabilistic data structure that is used to test whether an element is a member of a set. In particular, for each of the graph portions, the attributes identified in the index may be applied to a hash to determine one or more bits in the bloom filter to update. For example, if the index were for locations of users, a first location may change first bits in the bloom filter, while a second location may change second bits in the bloom filter. The size of the bloom filter may be determined based on the size of the graph, the size of the index, or based on some other factor.

When a request is generated for the graph, the bloom filters for each of the portions may be queried to determine whether the portion "may" or is "likely to" include information related to the query. As an example, if a query were generated to determine the total quantity of users of a social network that are in a particular location, the graph management system may query each of the bloom filters with the location to determine whether a user with that location is likely within that portion. The graph management system may then respond to the queries using the relevant portions identified using the bloom filters. In some examples, a bloom filter may return a false positive, wherein the bloom filter may indicate the presence of an attribute even though the attribute is not present in the graph portion. This may come as a result of the bloom filter being a probabilistic data structure that indicates that something is definitely not in the data set or the item is "probably" in the data set. To increase the accuracy, the size and type of hash employed for the bloom filter may be modified. In some implementations, the bloom filter may be used in association with edges in place of vertexes. In particular, an index may associate attribute values of an attribute type for the edges with one or more edges. Additionally, one or more delta indexes may be used to reflect changes in the graph, wherein the delta indexes may indicate edges that were added or removed, time stamps, or some other information for the modification.

FIG. 1 illustrates a graph 100 according to an implementation. Graph 100 includes vertices 110-115, wherein an example vertex 115 includes a unique identifier 120, attributes 130-132, and attribute types 140-142. Vertices 110-114, while not pictured, may each include a unique identifier and one or more attributes, wherein the attributes may be of the same attribute type as vertex 115 or may be different attribute types.

In operation, a graph management system may maintain graph 100 using one or more computing systems. Graph 100 may represent a social network, elements of an organization, a networking map, or some other graph. In graph 100, each vertex is allocated a unique identifier and may further include one or more attributes that correspond to the vertex. For example, vertex 115 includes unique identifier 120 with attributes 130-132 that correspond to attribute types 140-142. The attributes for each of the vertices may depend on the type of graph or type of vertex. For example, the attributes for a user in a social network may be different than the attributes for employees of an organization. The attribute types may include a name of the person associated with the vertex, the location of the person associated with the vertex, the age of the person associated with the vertex, the occupation of the person associated with the vertex, or some other attribute types. The edges that connect each of the vertices may further represent different relationships between the vertices, such as friendships, work acquaintances, or some other relationship between vertices of a graph.

In some implementations, graph 100 may be distributed across multiple portions, wherein each of the portions may maintain an index corresponding to a particular attribute type. For example, each of the portions may have a corresponding index for attribute type 140, wherein the index is used to associate attributes of the attribute type with corresponding vertices that share that attribute. Thus, if the index were for attribute type 140, the index may identify all vertices that share attribute 130. The indexes may then be used to respond to queries of the graph to more quickly by identifying vertices with relevant attributes.

Figure 2:
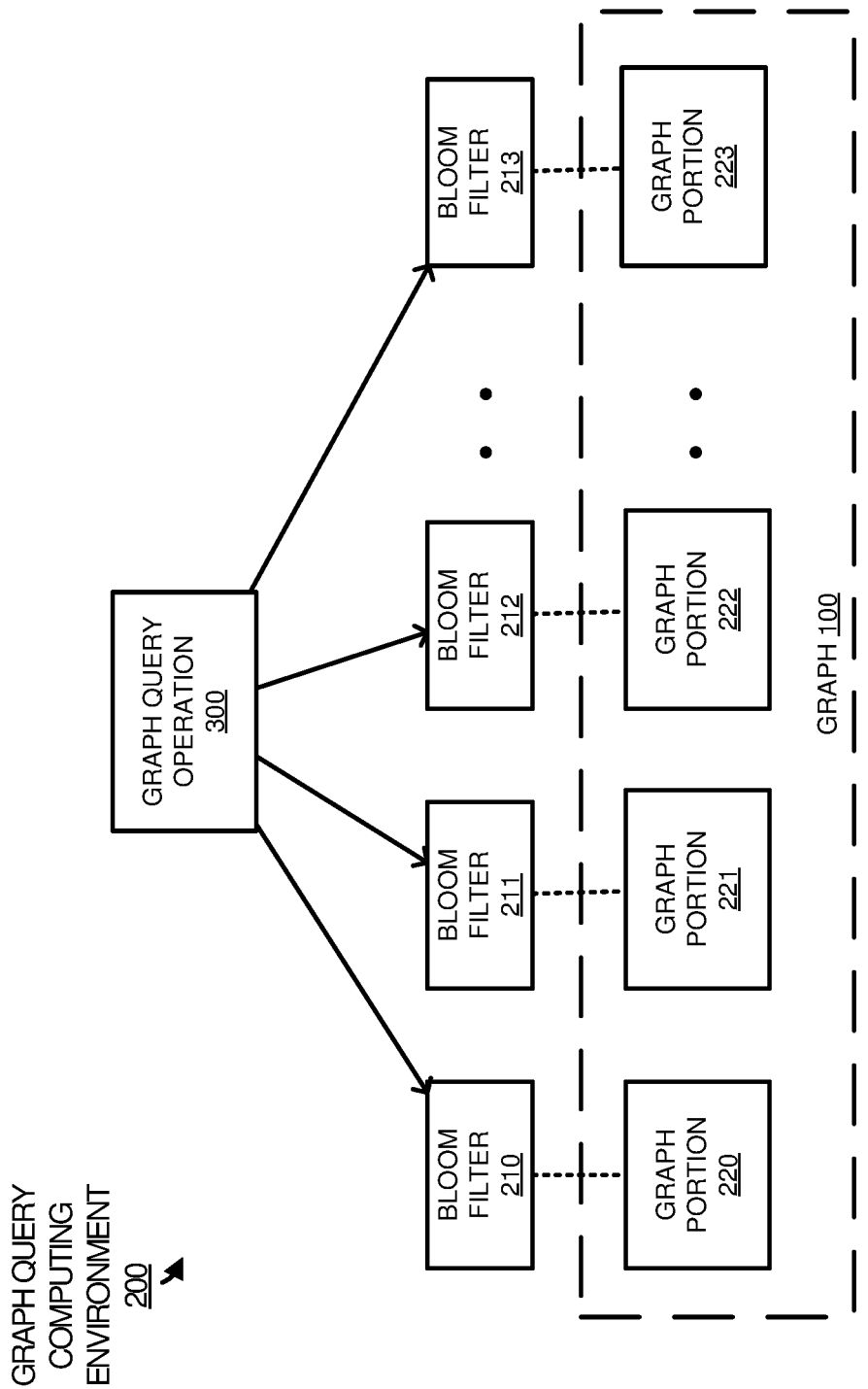
FIG. 2 illustrates a graph query computing environment according to an implementation.

FIG. 2 illustrates a graph query computing environment 200 according to an implementation. Graph query computing environment 200 includes bloom filters 210-213 and graph portions 220-223, which are representative of portions of a graph, such as graph 100 of FIG. 1. Graph query computing environment 200 further includes graph query operation 300 that may be implemented by a graph query computing system and is further described below in FIG. 3.

In operation, a graph data structure, such as graph 100, may be distributed into different portions, wherein the portions may be distributed on one or more physical computing systems. For each of the graph portions, an index may be maintained that corresponds to an attribute type for the vertices. In particular, each of the vertices may include a unique identifier and may further include one or more attributes associated with the vertex. In the example of a social network, the attributes may include the name of a user, the location of the user, the occupation of the user, or some other attribute associated with the vertex representing a user. An index may be generated that associates one or more attributes of an attribute type, such as location, with vertices that qualify for the attribute. Thus, for graph portion 220, an index may be generated with attributes identified in graph portion 220 for the attribute type and each entry in the index may be associated with vertices (unique identifiers for the vertices) that qualify for the attribute value or values in that entry.

Figure 3:
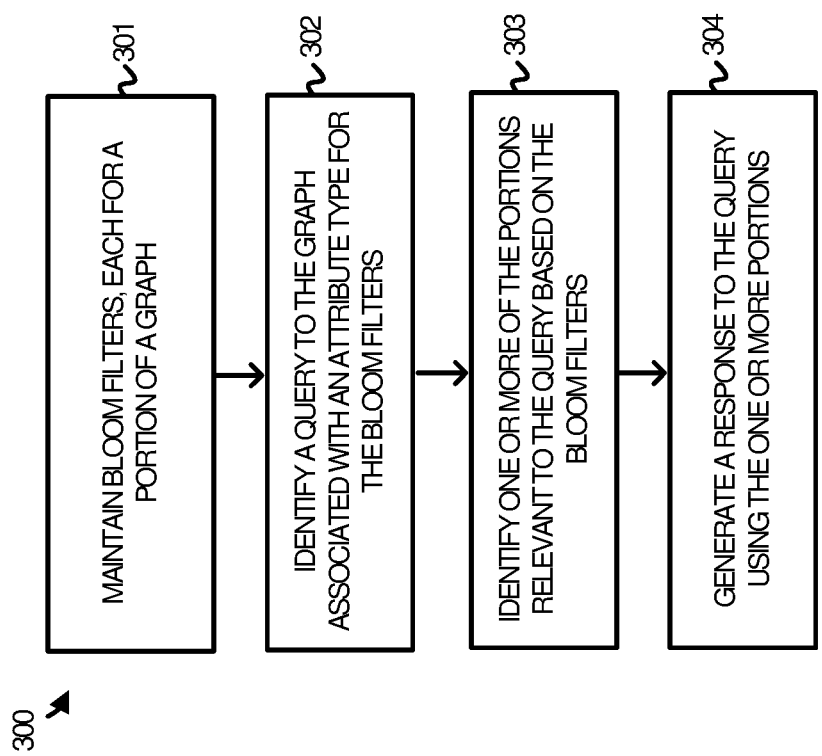
FIG. 3 illustrates a graph query operation according to an implementation.

In addition to maintain graph portions 220-223, bloom filters 210-213 are generated from the indexes. In generating a bloom filter of bloom filters 210-213, the system may identify attributes in a corresponding index and apply a hash to each of the attributes to determine what bits, if any, should be modified in the corresponding bloom filter. Using location as an example, when a hash is applied to a first location in an index, a first set of one or more bits may be changed in a bloom filter, while if the same hash is applied to a second location in the index, a second set of one or more bits may be changed in the bloom filter. When a query is generated that corresponds to the attribute type, rather than traversing the individual vertices in graph portions 220-223, an attribute identified in the query may be applied to the hash functions for bloom filters 210-213 to identify portions relevant to the query. Once identified, the bloom FIG. 3 illustrates a graph query operation 300 according to an implementation. Graph query operation 300 may be performed by graph management system capable of maintaining a graph and responding to queries to the graph. The steps of operation 300 are referenced parenthetically in the paragraphs that follow with reference to elements of graph query computing environment 200 of FIG. 2.

As depicted, graph query operation 300 includes maintaining (301) bloom filters associated with an attribute type for vertices in a graph, wherein each of the bloom filters applies to an index for the attribute type for a portion of the graph. In some implementations, a graph maintained by a graph management system may be distributed across multiple portions, wherein the portions may be distributed across one or more computing systems. Each of the portions may include vertices that each comprise a unique identifier and one or more attributes. The attributes may include names, locations, occupations, or some other attribute associated with the object that the vertices represent in the graph. An index for a portion of the graph may be used to take a particular attribute type, such as user location for a social network graph, and associate attribute values with identifiers for vertices that qualify for the attribute values. For example, an entry in the index for location may include a location, such as a city, state, or country, and identifiers for vertices that qualify for the location. In addition to the index, a bloom filter may be generated based on the values in the index, wherein the values for the index may be entered into a hash function to determine what bits to change in the bloom filter. For example, for graph portion 220 in graph computing environment 200, the graph management system may generate bloom filter 210 by identifying attributes in an index for the graph portion and applying the hash function for the bloom filter to identify bits to be changed in the filter.

As the bloom filters are maintained, graph query operation 300 identifies (302) a query to the graph associated with the attribute type for the indexes. The query may attempt to identify vertices associated with one or more attributes of the attribute type, identify a quantity of vertices associated with one or more attributes of the attribute type, or may request some other information associated with one or more attributes of the attribute type. In response to identifying the query, graph query operation 300 to identify (303) one or more of the portions relevant to the query based on the bloom filters. As an illustrative example, a query to a social network graph may attempt to identify users associated with a particular occupation. In response to the request, the occupation may be applied to each of the bloom filters for the occupation attribute type to identify whether the occupation might exist within that portion of the graph. If a bloom filter indicates that vertices related to the occupation do not exist in that portion of the graph, then that portion may be ignored for the purposes of responding to the query. In contrast, if the bloom filter indicates that vertices related to the occupation might exist in that portion, then the index for that portion may be searched to identify any vertices that might qualify for the occupation.

Once the one or more portions of the graph are identified, graph query operation 300 may generate (304) a response to the query using the one or more portions. For example, graph query operation 300 may identify that bloom filters 210-212 might include information related to a query. Once the portions are identified, the index for graph portions 220-222 may be used to identify vertices relevant to the query and may generate a response based on the information for the vertices. As an example, a query may include a request for users of a social network that live in a particular location, and the response may comprise a list of usernames identified from vertices that qualify for the location.

Although demonstrated in the previous example as using indexes for a single attribute type, it should be understood that similar operations may be done using multiple indexes and bloom filters for multiple attribute types. For example, a first index for a graph portion may be used for location of users of a social network, while a second index may be used for occupation of users in the social network. When a query is identified that includes a request for both occupations and locations, then the graph management system may use bloom filters for the two indexes to determine what portions are relevant for the query. In particular, the portions that are relevant to the query would be portions where both bloom filters indicated a likelihood that the relevant attributes were located in that portion. If a portion fails to indicate that there is a likelihood that the value is present in the portion, then that portion may be ignored for use in responding to the query.

Although demonstrated using vertexes, it should be understood that similar operations may be performed for edges, wherein an index and one or more delta indexes may associate attribute values for edges with edges that qualify for the values. Bloom filters may be generated using the attribute values to identify graph portions of interest to support a query to the graph.

Figure 4A:
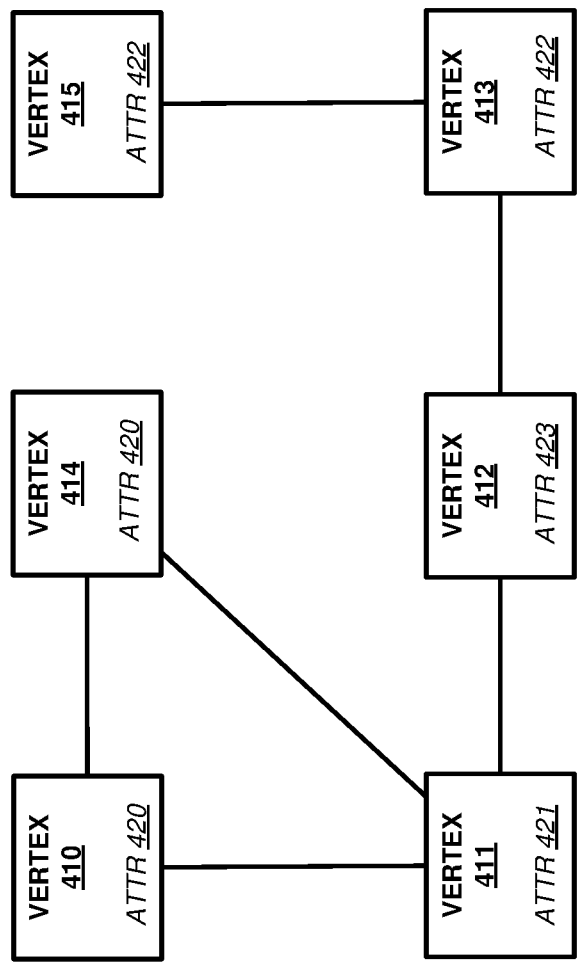
FIGS. 4A-4D illustrate an operational scenario of updating a bloom filter according to an implementation.
Figure 4A:
Figure 4B:
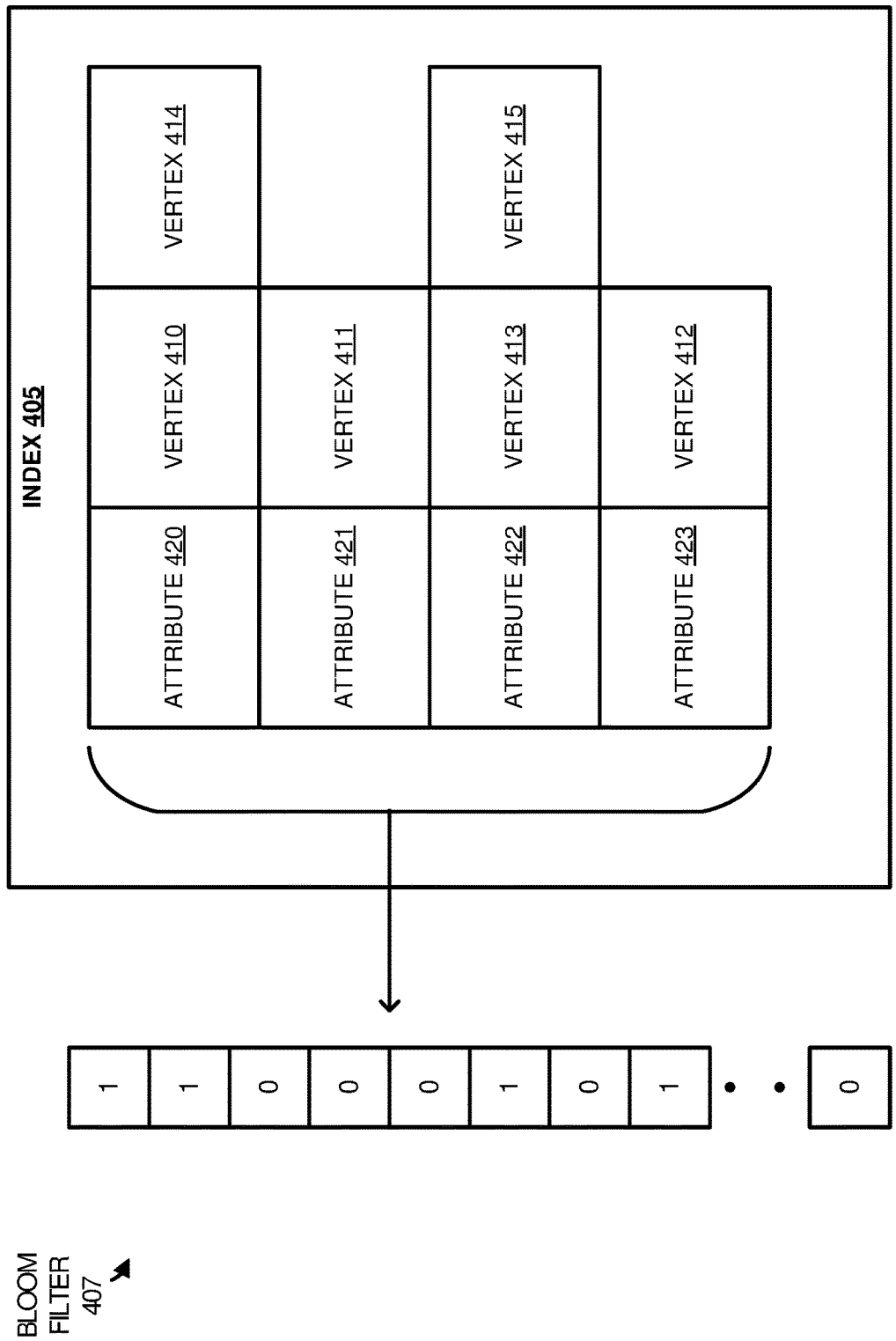
Figure 4C:
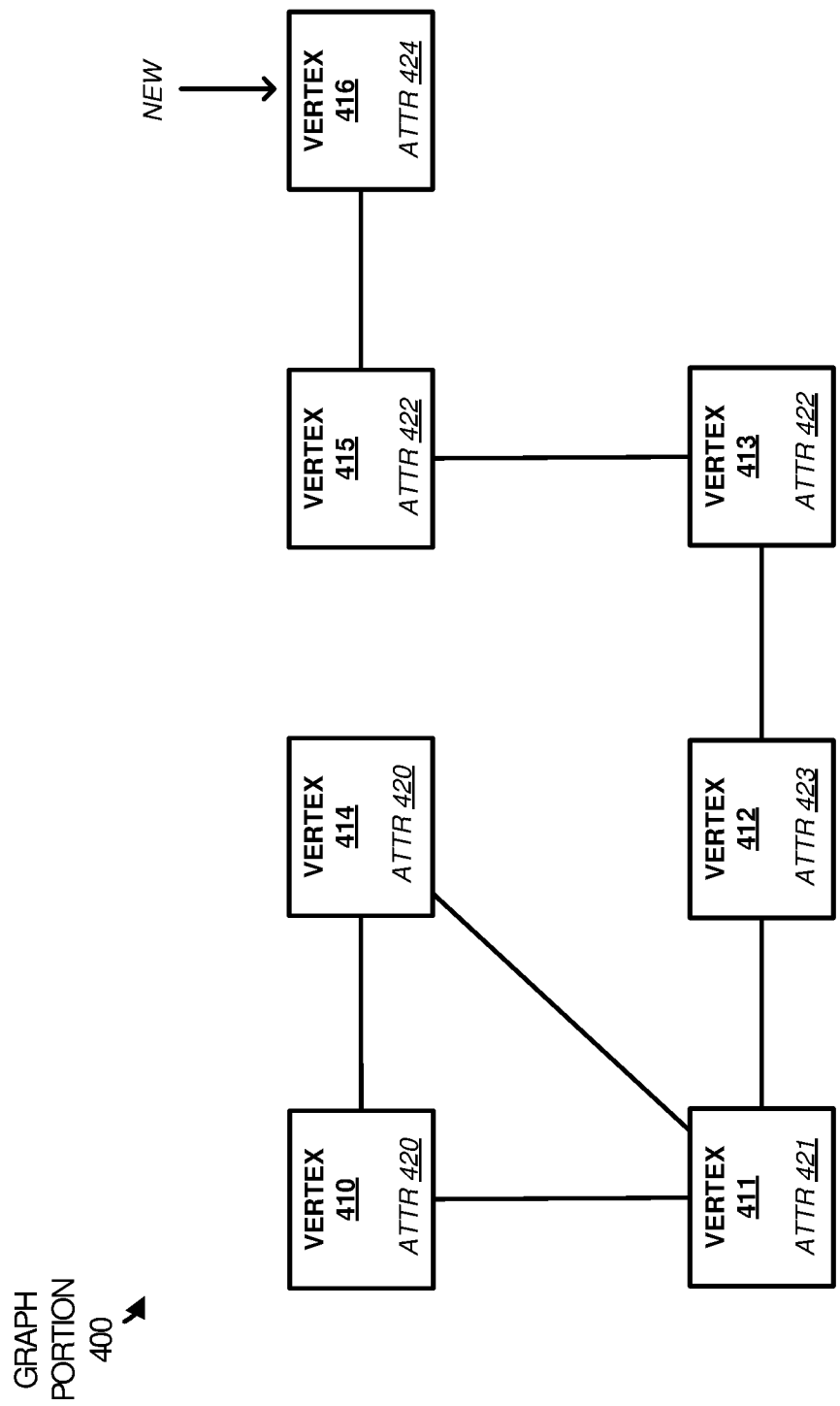
Figure 4D:
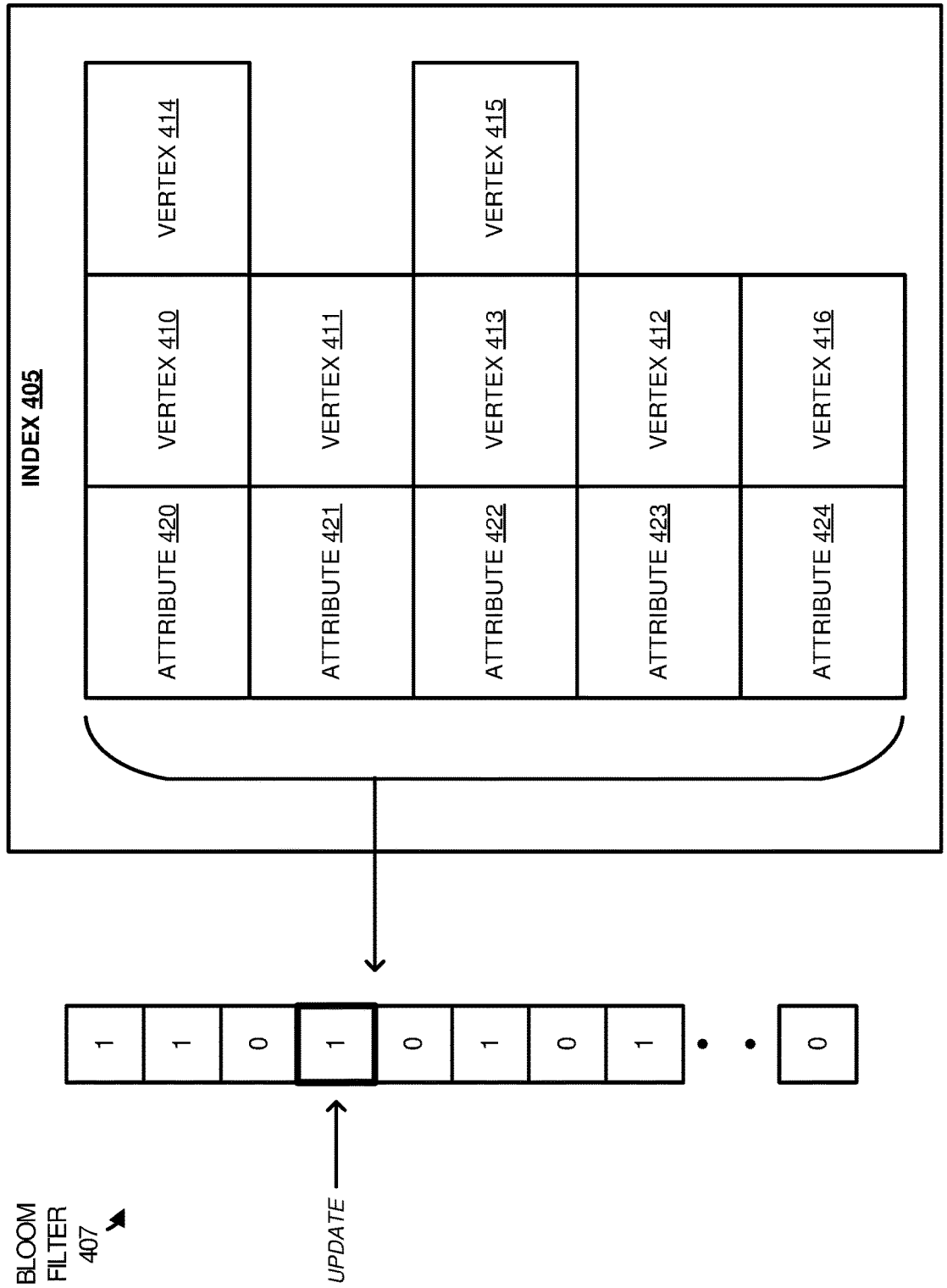

FIGS. 4A-4D illustrate an operational scenario of updating a bloom filter according to an implementation. FIGS. 4A and 4C include graph portion 400, wherein FIG. 4A includes vertices 410-415 with attributes 420-423 and FIG. 4C adds an additional vertex 416 with attribute 424. FIGS. 4B and 4D include index 405, which is representative of an index for an attribute type associated with attributes 420-424. The attribute type may include a username, a location, an occupation, or some other attribute associated with a vertex in a graph. FIGS. 4B and 4D further include bloom filter 407, which is generated by applying a hash function to attributes in index 405.

Referring first to FIG. 4A, a graph management system may maintain a graph, wherein the graph may be distributed into multiple portions that can reside on one or more computing systems. Graph portion 400 is representative of a portion of a graph that includes vertices 410-415, wherein the vertices include attributes 420-423 of a particular attribute type. For example, in a social network, the attribute type may comprise a location and the users associated with vertices 410-414 may share the same location as attribute 420. Additionally, the graph may include edges that are used to represent relationships between the different vertices, wherein the relationships may include friendships, work contacts, or some other relationship between the vertices.

Turning to FIG. 4B, as the graph is maintained by the graph management system, the graph management system may generate an index 405 for each of the graph portions, wherein the index may correspond to a particular attribute type. In particular each entry in the index includes an attribute of attributes 420-423 and vertices that qualify for the attribute. Although demonstrated in the example of index 405 as including a single attribute per entry, it should be understood that each entry may include multiple attributes, such as a range or list of attributes (e.g., cities in a geographic region). From index 405, the graph management system may generate bloom filter 407, wherein the bloom filter is generated using hashes of attributes 420-423 that correspond to one or more bits in the bloom filter. When a query is generated for an attribute, the hash may be applied to the attribute to determine whether there is a likelihood of the attribute within the particular portion of the graph, wherein the likelihood is determined based on whether bits are a particular value (i.e., "1") in the bloom filter.

Referring now to FIG. 4C, FIG. 4C introduces a new vertex 416 with attribute 424 to graph portion 400. In response to the addition, as depicted in FIG. 4D, attribute 424 may be added as an entry in index 405, wherein the entry associates attribute 424 with vertex 416. Additionally, once attribute 424 is added, bloom filter 407 is updated based on the addition to index 405, wherein a hash function may be applied to attribute 424 to identify one or more bits to modify in bloom filter 407.

Figure 5:
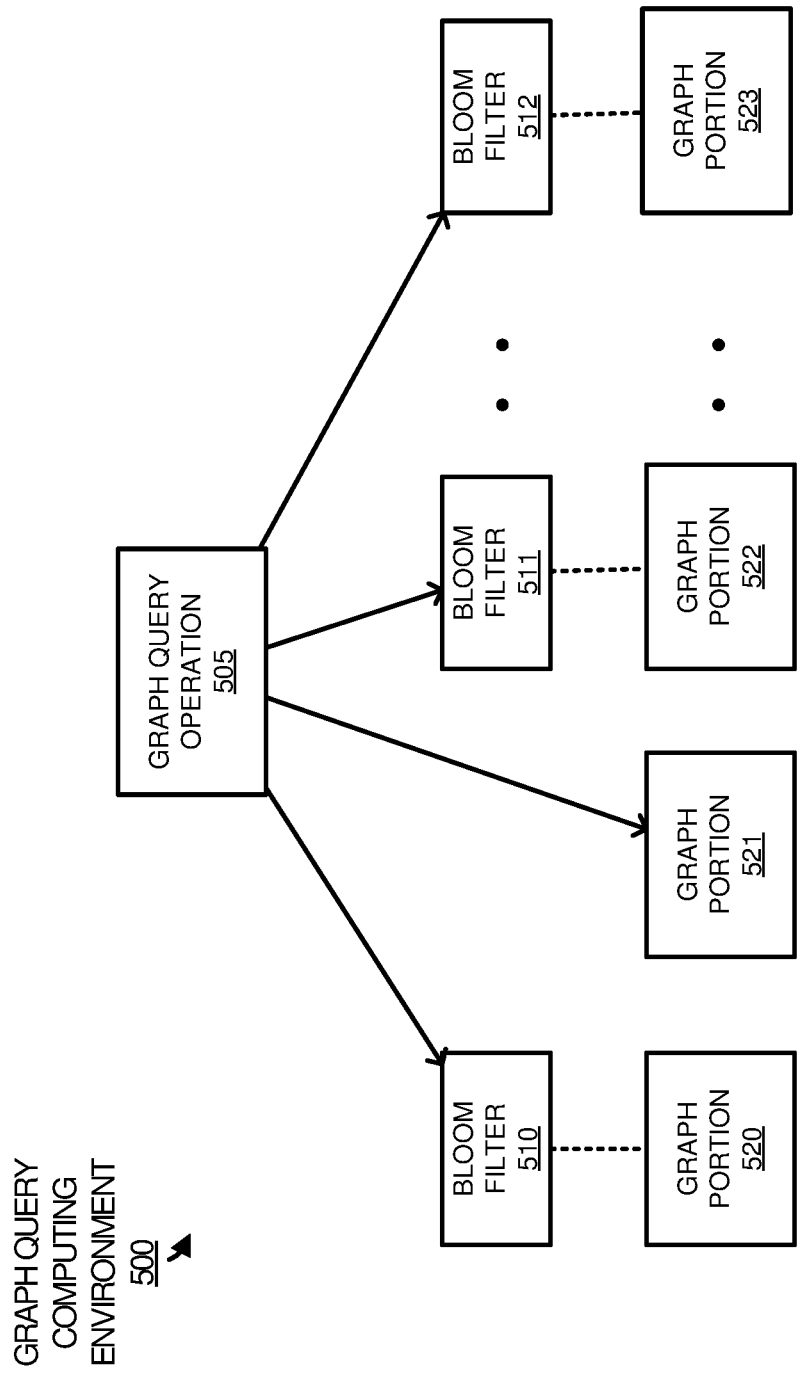
FIG. 5 illustrates an operational scenario of using bloom filters to respond to graph queries according to an implementation.

FIG. 5 illustrates a graph query computing environment 500 of using bloom filters to respond to graph queries according to an implementation. Graph query computing environment 500 includes graph query operation 505, bloom filters 510-512, and graph portions 520-523.

As described herein, a graph management system may store a graph as graph portions 520-523, wherein each of the portions may store information about different vertices and edges associated with the graph. Each of the vertices may include a unique identifier and may further include one or more attributes that provide information about the object represented by the vertex. For example, while each user in a social network may be allocated a unique identifier, other attributes may be associated with the user, such as a username, age, location, or some other information for the users. Each of the users may further be connected to other users with edges, wherein the edges may be used to define relationships between the individual users.

In some implementations, graph portions may include one or more indexes that can be used to index the vertices using an attribute outside of the unique identifiers for the vertices. From the index, bloom filters 510-512 may be generated that can be used to identify whether an attribute of interest is "likely" located in the corresponding graph portion. Here, graph portion 521 does not include a bloom filter. This may occur as a result of a configuration decision for graph portion 521, wherein a an administrator may choose not to implement an index for the graph portion, may occur as a result of a delay in updating the index for the graph portion, or may occur for any other reason. In some implementations, an index for attributes may be updated based on changes to the graph portion. For example, when a vertex is added to the graph portion, the index for the graph portion may be required to be updated based on the new. If the index cannot be updated, then graph query operation may be required to traverse graph portion 521 using the unique identifier to identify relevant vertices in for the query.

In one example, graph query operation 505 may obtain a query associated with the one or more attributes of an attribute type. In response to the query, graph query operation 505 may identify bloom filters that correspond to updated indexes for the attribute type. Here graph portions 520 and 522-523 include an updated index and bloom filter, while graph portion 521 does not. As a result, graph query operation 505 may query the available bloom filters to identify graph portions that likely have information relevant to the query. If the graph portion might include relevant information, graph query operation 505 may identify the relevant vertices for the query from the corresponding graph portion. Additionally, graph query operation 505 may traverse graph portion 521 to determine vertices relevant to the query. Once the vertices are identified in graph portions 520-523, graph query operation 505 may generate a response to the query using the identified vertices.

Figure 6:
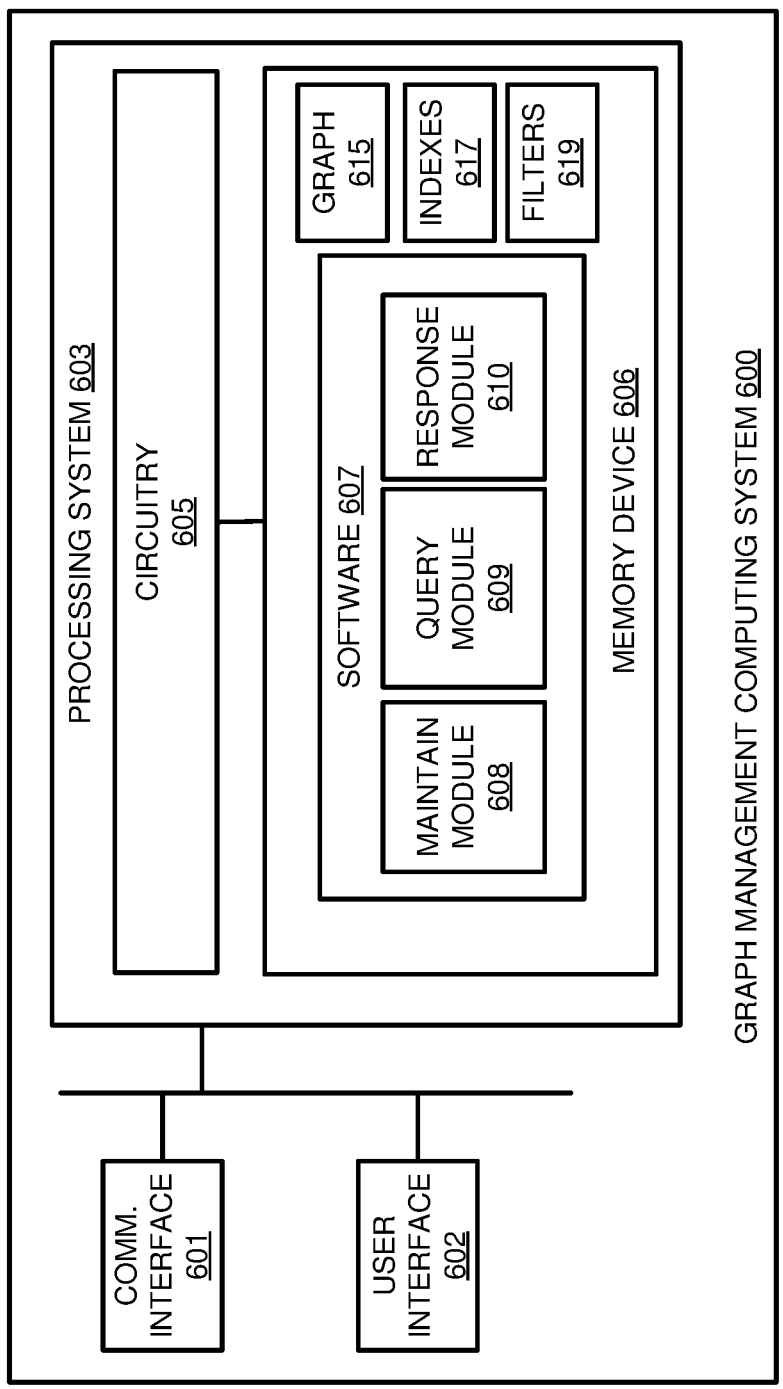
FIG. 6 illustrates a graph management computing system according to an implementation.

FIG. 6 illustrates a graph management computing system 600 according to an implementation. Computing system 600 is representative of any computing system or systems with which the various operational architectures, processes, scenarios, and sequences disclosed herein for a graph management system may be implemented. Computing system 600 comprises communication interface 601, user interface 602, and processing system 603. Processing system 603 is linked to communication interface 601 and user interface 602. Processing system 603 includes processing circuitry 605 and memory device 606 that stores operating software 607. Computing system 600 may include other well-known components such as a battery and enclosure that are not shown for clarity.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In at least one implementation, communication interface 601 may be configured to communicate with one or more client computing systems, wherein the communications may be used to define queries to graph 615 or provide a response to the queries to the client system. In some implementations, communication interface 601 may be used to communicate with one or more graph storage systems or graph storage computing systems that may store one or more portions of graph 615.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples.

Processing circuitry 605 comprises microprocessor and other circuitry that retrieves and executes operating software 607 from memory device 606. Memory device 606 may include volatile and nonvolatile, removable and non-removable media implemented in any method or technology for storage of information, such as computer readable instructions, data structures, program modules, or other data. Memory device 606 may be implemented as a single storage device but may also be implemented across multiple storage devices or sub-systems. Memory device 606 may comprise additional elements, such as a controller to read operating software 607 and data for graph 615 and indexes 617, and filters 619. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes maintain module 608, query module 609, and response module 610, although any number of software modules may provide a similar operation. Operating software 607 may further include an operating system, utilities, drivers, network interfaces, applications, or some other type of software. When executed by processing circuitry 605, operating software 607 directs processing system 603 to operate computing system 600 as described herein.

In one implementation, maintain module 608 directs processing system 603 to maintain bloom filters 619 associated with an attribute type for vertices in graph 615, wherein each of filters 619 applies to an index of indexes 617 for the attribute type for a portion of graph 615. Graph 615 may include vertices that each comprise a unique identifier and attributes of various attribute types. To assist in responding to queries, indexes 617 are generated that each correspond to a different portion of graph 615. Each entry in an index may associate one or more attributes with one or more vertices that qualified for the one or more attributes. In addition to the indexes, each filter of filters 619 is updated based on the attributes in the index. For example, if the index were used for locations of users of a social network, then a hash function may be applied to the locations in the index to determine bits in the bloom filter to be changed.

As indexes 617 are maintained, query module 609 may direct processing system 603 to identify a query to graph 615, wherein the query requests information related to the attribute type for indexes 617. As an example, if graph 615 represented a social network, a query to graph 615 may request of usernames that are located in a geographic region. In response to the request, response module 610 directs processing system 603 to identify one or more of the portions relevant to the query based on filters 619. In some implementations, response module 610 may direct processing system 603 to identify relevant attributes in the query and apply the hash or hashes associated with filters 619 to identify portions of graph 615 that are relevant in responding to the query. Once the relevant portions are identified, response module 610 directs processing system 603 to respond to the query using at the identified portions. Returning to the example of a query requesting usernames that are located in a geographic region, computing system 600 may identify portions with a likelihood of containing vertices relevant to the geographic region using filters 619. Once identified, computing system 600 may traverse the indexes for the relevant portions to identify any vertices relevant to the query and may respond to the query using at least the identified vertices. This may include providing a list of usernames associated with the identified vertices.

In some implementations, while some portions of the graph may include an index and a corresponding bloom filter, other portions of the graph may not include an index or may not include an updated index or bloom filter. As a result, when a query is generated, computing system 600 may identify which portions include an updated index and bloom filter and use the updated bloom filters to determine whether relevant vertices are likely in the portions. If a portion does not include an updated index, then computing system 600 may traverse the graph portion to identify whether any vertices are relevant to the query. This traversal of the graph portion may occur in parallel with the query to the bloom filters, may occur after the use of the bloom filters and indexes, or may occur in some other sequence.

Although demonstrated in the previous examples as using indexes for a single attribute type, it should be understood that graph management computing system 600 may use indexes for multiple attributes to respond to a particular query. In some implementations, when a query is associated with multiple attribute types, the graph management computing system may determine which of the portions could contain the relevant attributes based on bloom filters associated with each of the graph portions. If bloom filters associated with a graph portion of the graph portions indicates that the relevant attributes are present in the graph portion, then the graph management computing system may select the graph portion as relevant to respond to the query. However, if one or more of the bloom filters for a portion indicate that a relevant attribute is not located in the portion, the portion will not be used in responding to the query.

In some examples, a bloom filter for a graph portion is only updated when an attribute or vertex that is relevant to the bloom filter is added to the graph portion. In this example, when an attribute or vertex is removed from the graph portion, the bloom filter is not updated to reflect the change. In some implementations, the bloom filter may be rebuilt based on the index to reflect changes in the graph. This rebuilding of the bloom filter may occur at periodic intervals, during a downtime for queries to the graph, or at some other interval. In rebuilding the bloom filter, the graph management computing system may be able to reflect additions and deletions from the graph.

Although demonstrated in the previous examples as using indexes to support the identification of attributes in vertices, it should be understood that similar operations may be used to identify edges for a query. In particular, rather than searching for one or more attributes in a vertex, the search may use an index that is associated with an attribute type for an edge. For example, an index may be maintained that identifies friendships between members of a social network. Each of the edges may include a unique identifier and may include attributes or other values associated with the edge, including the length of the relationship, the type of relationship, or some other information associated with the relationship between the members. From the attributes, an attribute type, such as the length of the relationship, may be selected for the index and an index generated similar to the secondary vertex index. Accordingly, when a query is received in association with the attribute type for the edge, the edge index may be searched to identify the relevant edges, the vertices associated with the relevant edges, or some other information for the query.

In some implementations, the edge index may be distributed across multiple graph portions and the index may be used to update bloom filters as described herein. When a query is generated, a search of each of the bloom filters may result in identifying portions that are relevant to the query and, once the portions are identified, the edge index for the portions may be searched to identify the relevant data.

In some examples, the edge index may be updated using delta indexes, wherein a first version of an index may be updated by supplementary delta indexes that define when edges were added or removed and can be combined as further described below to respond to a query. In particular, a query may define a time period of interest for the graph and one or more delta indexes may be combined with the first version of the index to determine the relevant data for the query. Once combined, a search may be performed to identify edges and/or vertices associated with the query and respond to the query using the identified edges and/or vertices.

Figure 7A:
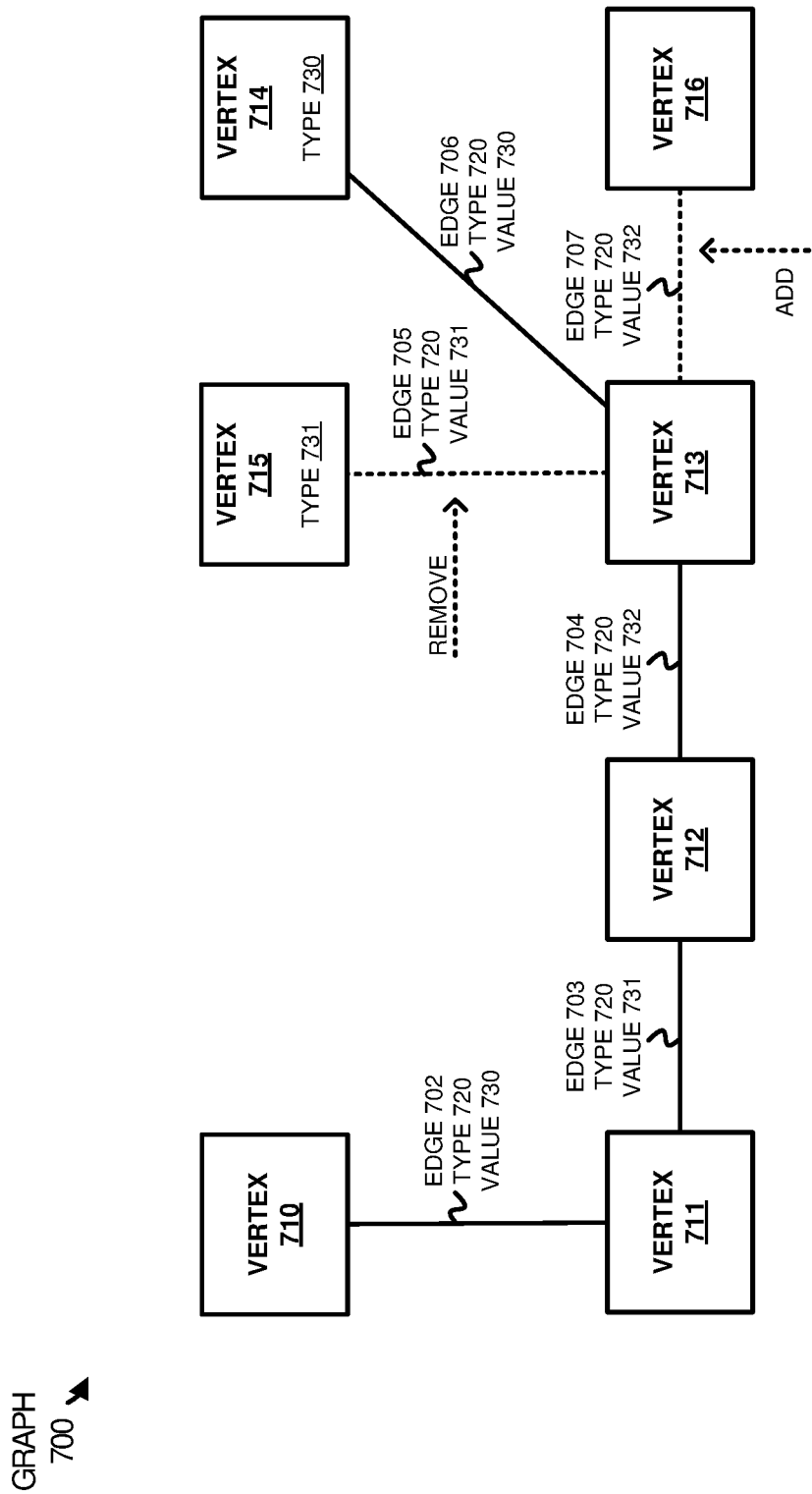

FIGS. 7A-7C illustrate an operational scenario of updating an edge index according to an implementation. FIG. 7A includes a graph 700 with vertices 710-716 that are connected with edges 702-707. Edges 702-707 are representative of an edge of type 720 with various values from values 730-732.

In operation, graph 700 is generated that includes vertices 710-716, which are representative of data instances and the edges that are representative of the relationships associated with the data instances. For example, the vertices in the graph may represent members of a social network, while the edges are used to define the relationships between the various members. In some implementations, the edges may include a unique identifier, represented in FIG. 7A by edges 702-707. The unique identifier is used to uniquely identify the edge in relation to the other edges in the graph. The unique identifier may comprise a unique value in some examples or may comprise a unique location (e.g., pointer) to the data associated with the edge. In addition to the unique identifier, each edge may further be associated with attributes or values that can provide information about the relationship for the edge. Returning to the example of a social network, the edge attributes may include a length of a relationship, a type of relationship, or any other information associated with the relationship.

After the graph is generated, queries may be made to identify information from the graph, wherein the queries may indicate one or more attribute values in the edges. For example, a query may be generated that identifies members of the social network that have been friends for at least twenty years. Here, instead of traversing each of the edges to identify the relevant information, an edge index may be generated that can be searched to identify specific attributes without traversing at least a portion of the graph.

Turning to FIG. 7B, FIG. 7B includes edge index 750 and delta index 755. Edge index 750 associates attribute values 730-732 with corresponding edges 702-706. Additionally, FIG. 7B includes delta index 755 that is used to update the information in edge index 750. Specifically, delta index 755 associates a value 731 with a removed edge 705 and a value 732 with edge 707 that is added to the graph. Although demonstrated with unique identifiers for edges, in some implementations, a graph may not include a unique identifier for each edge. Instead, the index stores, as the unique identifier, the location of where the edge is stored or a pointer to the storage location for the data associated with the edge. The data associated with the edge may include identifiers for vertices or endpoints for the edge, attributes associated with the edge, or some other data.

Once a graph is generated, edge index 750 may be used to provide information about the associated edge attribute type. In some examples, the graph management system may traverse the graph, identify edges with the relevant attribute type, and generate edge index 750 that associates values to edges with the value. When edge index 750 is generated, edge index 750 may represent the snapshot of the graph at a first time. When modifications are made to the graph, delta index 755 may be used to reflect the update, wherein entries in delta index 755 associate an edge and indicate whether the edge was added or removed, and a time stamp associated with the addition or removal. In some implementations, the addition or removal may indicate a new edge or may indicate that a value was added or changed in association with an edge. For example, when edge 707 is added with value 732 in delta index 755, edge 707 may already exist in the graph, but may have added value 732 to the edge.

When a query is received for the graph in association with attribute value type 720, the graph management system may determine a time period that is relevant to the query and compile the information from edge index 750 and delta index 755 to support the required time period. Once compiled, the graph management system may identify the relevant information for the query and respond to the query using the relevant information. For example, the graph management system may identify whether changes associated with edge 705 or edge 707 includes a time stamp to qualify for the relevant time period and may compile the changes, if necessary, into edge index 750 to respond to a query.

Although demonstrated as only identifying the edge in edge index 750 and delta index 755, it should be understood that other information may be identified for each edge. This other information may indicate one or more of the vertices connected by the edge, other attributes or values associated with the edge, or some other information associated with the edge. While demonstrated in the example of FIG. 7B as using a single delta index, it should be understood that multiple delta indexes may be maintained to reflect changes in the graph.

Referring now to FIG. 7C, at periodic intervals, at the time of query, or at some other interval, one or more delta indexes may be merged into the base edge index to generate a merged edge index. Here, delta index 755 is merged into edge index 750 to generate merged index 752. Merged index 752 removes edge 705 based on delta index 755 and further adds edge 707. This new merged index may become a new based index or may be used to respond to one or more queries, wherein the merged index may further be updated using one or more additional delta indexes.

In some implementations, a bloom filter may be used to identify if a relevant value is located in the graph or graph portion, wherein the values are hashed into the bloom filter from edge index 750 and delta index 755. In particular, if a new edge is added to a delta index and is associated with a new value, the new value may be hashed into the bloom filter, permitting the graph management system to determine whether an edge with that value could be located in that portion of the graph. In the example of edge index 750, the bloom filter would be used to indicate that values 730-732 may be located in graph portion 700. In some examples, when graph 700 is part of a larger graph distributed across multiple portions, the graph management system may query each of the bloom filters to identify relevant portions of the graph. Once the portions are identified, the index for each of the portions may be traversed to identify the relevant edges for the query. In examples where the bloom index for a portion is either non-existent or is not updated with the relevant information for added edges, the graph portion may be traversed to identify the relevant edges to support the query. The information from each of the portions may then be used in responding to the query.

Figure 8:
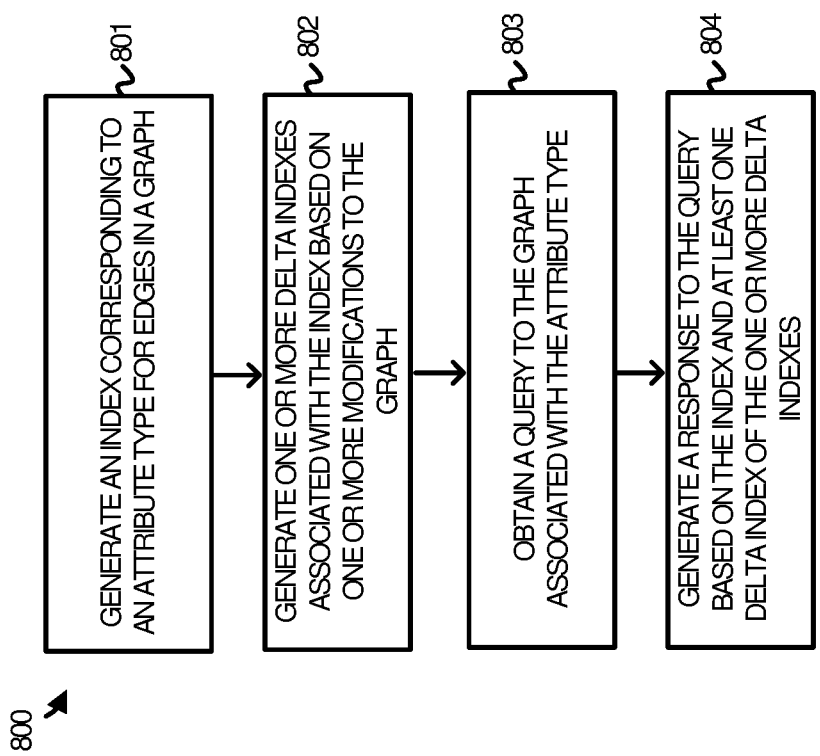
FIG. 8 illustrates an operation to update an edge index according to an implementation.

FIG. 8 illustrates an operation 800 to update an edge index according to an implementation. The steps of operation 800 are referenced parenthetically in the paragraphs that follow with some reference to the elements from FIGS. 7A-7C. The steps of operation 800 may performed by graph management computing system 600 of FIG. 6, although other graph management systems may exist.

As depicted, operation 800 includes generating (801) an index corresponding to an attribute type or value type for edges in a graph. Operation 800 further includes generating (802) one or more delta indexes associated with the index based on one or more modifications to the graph. In some implementations, the index is used to associate values of the value type with edges that match those values. In addition to the index, one or more delta indexes can be maintained that provide information about whether an edge value was added or removed, a timestamp associated with the modification, or some other information associated with the modification to the graph. Each of the indexes may identify the edges associated with the value using a unique identifier for the edge, the vertices that are connected by the edge, or some other unique identifier for the edge. In some implementations, the delta indexes may include offsets that indicate where the update should be placed in the data structure for the edges. For example, when an edge is added in the graph or a value is added to an edge, the offset for the delta index may be used to identify where the edge should be added in relation to the base index data structure.

As the one or more delta indexes are created, operation 800 obtains (803) a query to the graph associated with the attribute type for the edge and generates (804) a response to the query based on the index and at least one delta index of the one or more delta indexes. In one implementation, a query to a graph may indicate a time period of interest. Based on the time period of interest, a graph management system may determine which of the delta indexes should be used to respond to the query and may compile the information from the index and the delta indexes to respond to the query.

In some implementations, a graph management service may maintain one or more bloom filters that are used to identify when attribute values might be located in the graph. For example, an index may be distributed for multiple portions of a graph and a delta indexes may be maintained for modifications to each of those portions. For each of the portions, a bloom filter may be maintained that indicates whether an attribute value might be located in that portion of the graph, wherein the bloom filter may be based on the index for the portion and any delta indexes for the portion. When a query is received in association with a value, the graph management system may query the bloom filters to determine which of the portions may include a relevant edge or edges. Once the relevant portions are identified, the graph management system may compile the information from each of the portions using the index and the delta indexes to respond to the query. As an example, a query may be generated that requests all friendships that have lasted a period of time for a social network. In response to the request, the graph management system may query the one or more bloom filters that are generated from the index and one or more delta indexes to determine whether any edges exist for the period and what portions of the graph edges may exist. Once identified, the graph management system may generate a response using the information from the index and one or more delta indexes and may further use information from the graph itself.

In some implementations, the bloom filter may be recalculated to reflect the changes imposed using the delta indexes. The recalculation may occur periodically, based on a quantity of changes to the graph, when a delta index is compiled into the index, or at some other interval. In at least one implementation, if a delta index is incorporated into the base index, the bloom filter may be recalculated, such that values that have been removed from the graph are no longer included in the determination of the bloom filter. However, the values that were added to the graph may be maintained in the hashing or determination of the bloom filter.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
generating, at a memory, an index associated with each of a plurality of portions of a graph stored in a graph storage system, each index corresponding to an edge attribute type of a plurality of edge attribute types associated with edges in the associated portion of the graph, wherein each of the plurality of edge attribute types represents a characteristic of a relationship between vertexes in the graph, wherein the plurality of portions are distributed across a plurality of computing systems, and wherein the generating the index comprises:
identifying the edges in the associated portion of the graph having the edge attribute type, wherein each edge of the edges includes a unique identifier and one or more edge attribute values each having at least one of the plurality of edge attribute types, and
populating the index with a plurality of entries, each of the plurality of entries associating a set of edge attribute values for the edge attribute type with one or more of the unique identifiers for one or more of the edges having the set of edge attribute values, wherein the set of edge attribute values comprises one or more specific values for the edge attribute type, and wherein at least one entry of the plurality of entries comprises at least two unique identifiers;
generating, at the memory, a bloom filter for each of the plurality of portions based on edge attribute values in the portion, wherein the bloom filter is generated using hashes of edge attribute values that correspond to one or more bits in the bloom filter;
generating, at the memory, a delta index associated with a first portion of the plurality of portions based on one or more modifications to the graph, wherein the delta index comprises a delta entry identifying a change affecting a corresponding entry of the plurality of entries in the index associated with the first portion;
updating the bloom filter for the first portion based on the change identified in the delta index;
obtaining a query to the graph having one or more queried attribute values for the edge attribute type;
identifying that the first portion is relevant to the query based on its associated bloom filter and the one or more queried attribute values;
identifying that a second portion of the plurality of portions is not relevant to the query based on its associated bloom filter and the one or more queried attribute values; and
generating a response to the query based on the first portion and its associated delta index.

2. The method of claim 1, wherein the one or more modifications comprise one or more additions or deletions of edges in the graph.

3. The method of claim 1, further comprising:
generating, at the memory, a plurality of delta indexes each corresponding to one of the plurality of portions.

4. The method of claim 1, wherein the unique identifier for an edge of the edges is based on at least one vertex for the edge.

5. The method of claim 1, wherein the delta index comprises one or more entries, and wherein each of the one or more entries associates an attribute value of the edge attribute type with an edge and a timestamp for addition or deletion of the edge.

6. A computing apparatus comprising:
a storage system;
a processing system operatively coupled to the storage system; and
program instructions stored on the storage system that, when executed by the processing system, direct the computing apparatus to:
generate, at a memory of the storage system, an index associated with each of a plurality of portions of a graph stored in a graph storage system, each index corresponding to an edge attribute type of a plurality of edge attribute types associated with edges in the associated portion of the graph, wherein each of the plurality of edge attribute types represents a characteristic of a relationship between vertexes in the graph, wherein the plurality of portions are distributed across a plurality of computing systems, and wherein the generating the index comprises:
  identifying the edges in the associated portion of the graph having the edge attribute type, wherein each edge of the edges includes a unique identifier and one or more edge attribute values each having at least one of the plurality of edge attribute types, and
  populating the index with a plurality of entries, each of the plurality of entries associating a set of edge attribute values for the edge attribute type with one or more of the unique identifiers for one or more of the edges having the set of edge attribute values, wherein the set of edge attribute values comprises one or more specific values for the edge attribute type, and wherein at least one entry of the plurality of entries comprises at least two unique identifiers;
generate, at the memory, a bloom filter for each of the plurality of portions based on edge attribute values in the portion, wherein the bloom filter is generated using hashes of edge attribute values that correspond to one or more bits in the bloom filter;
generate, at the memory, a delta index associated with a first portion of the plurality of portions based on one or more modifications to the graph, wherein the delta index comprises a delta entry identifying a change affecting a corresponding entry of the plurality of entries in the index associated with the first portion;
update the bloom filter for the first portion based on the change identified in the delta index;
obtain a query to the graph having one or more queried attribute values for the edge attribute type;
identify that the first portion is relevant to the query based on its associated bloom filter and the one or more queried attribute values;
identify that a second portion of the plurality of portions is not relevant to the query based on its associated bloom filter and the one or more queried attribute values; and
generate a response to the query based on the first portion and its associated delta index.

7. The computing apparatus of claim 6, wherein the one or more modifications comprise one or more additions or deletions of edges in the graph.

8. The computing apparatus of claim 6, wherein the program instructions further direct the computing apparatus to generate, at the memory, a plurality of delta indexes each corresponding to one of the plurality of portions.

9. The computing apparatus of claim 6, wherein the unique identifier for an edge of the edges is based on at least one vertex for the edge.

10. The computing apparatus of claim 6, wherein the delta index comprises one or more entries, and wherein each of the one or more entries associates an attribute value of the edge attribute type with an edge and a timestamp for addition or deletion of the edge.

11. A method comprising:
  generating, at a memory, an index associated with each of a plurality of portions of a graph stored in a graph storage system, each index corresponding to an edge attribute type of a plurality of edge attribute types associated with edges in the associated portion of the graph, wherein each of the plurality of edge attribute types represents a characteristic of a relationship between vertexes in the graph, wherein the plurality of portions are distributed across a plurality of computing systems, and wherein the generating the index comprises:
    identifying the edges in the associated portion of the graph having the edge attribute type, wherein each of the edges includes a unique identifier and one or more attribute values each having at least one of the plurality of edge attribute types, and
    populating the index with a plurality of entries, each of the plurality of entries associating a set of edge attribute values for the edge attribute type with one or more of the unique identifiers for one or more of the edges having the set of edge attribute values, wherein at least one entry of the plurality of entries comprises at least two unique identifiers, and wherein the set of edge attribute values comprises one or more specific values for the edge attribute type;
  generating, at the memory, one or more delta indexes associated with each of the plurality of portions based on one or more modifications to the graph, wherein each of the one or more delta indexes comprises a delta entry identifying a change affecting a corresponding entry of the plurality of entries in the associated index;
  generating, at the memory, a bloom filter for each of the plurality of portions based on the associated index and the associated one or more delta indexes wherein the bloom filter is generated using hashes of edge attribute values that correspond to one or more bits in the bloom filter;
  obtaining a query to the graph having one or more queried attribute values for the edge attribute type;
  identifying a first portion of the plurality of portions associated with the query based on the bloom filters and the one or more queried attribute values;
  identifying that a second portion of the plurality of portions is not relevant to the query based on its associated bloom filter and the one or more queried attribute values; and
  generating a response to the query based on the index and at least one delta index of the one or more delta indexes associated with the first portion.

12. The method of claim 11, wherein the one or more modifications comprise one or more additions or deletions of edges in the graph.

13. The method of claim 11, wherein the one or more delta indexes each comprise one or more entries, and wherein each of the one or more entries associates an attribute value of the edge attribute type with an edge and a timestamp for addition or deletion of the edge.

* * * * *